(12) United States Patent
Sato

(10) Patent No.: US 8,989,126 B2
(45) Date of Patent: Mar. 24, 2015

(54) WIRELESS BASE STATION AND WIRELESS COMMUNICATION METHOD

(75) Inventor: Yoshizo Sato, Daito (JP)

(73) Assignee: KYOCERA Corporation, Kyoto (JP)

( * ) Notice: Subject to any disclaimer, the term of this patent is extended or adjusted under 35 U.S.C. 154(b) by 155 days.

(21) Appl. No.: 13/809,386

(22) PCT Filed: Jul. 7, 2011

(86) PCT No.: PCT/JP2011/065606
§ 371 (c)(1),
(2), (4) Date: Jan. 9, 2013

(87) PCT Pub. No.: WO2012/005334
PCT Pub. Date: Jan. 12, 2012

(65) Prior Publication Data
US 2013/0114555 A1   May 9, 2013

(30) Foreign Application Priority Data

Jul. 9, 2010   (JP) .................................. 2010-156703

(51) Int. Cl.
*H04J 1/00*   (2006.01)
*H04W 72/04*   (2009.01)
(Continued)

(52) U.S. Cl.
CPC ............ *H04W 72/04* (2013.01); *H04W 72/046* (2013.01); *H04B 7/02* (2013.01); *H04L 5/0023* (2013.01); *H04L 5/0051* (2013.01); *H04L 5/1469* (2013.01)
USPC .......................................... 370/329; 370/482

(58) Field of Classification Search
CPC ..... H04W 72/04; H04W 88/08; H04W 74/04; H04W 72/042; H04W 72/046; H04W 72/0446; H04W 72/0453; H04L 15/14; H04B 7/2621; H04J 1/00
USPC .......................... 370/280, 329, 343, 345, 482
See application file for complete search history.

(56) References Cited

U.S. PATENT DOCUMENTS

| 7,979,077 B2 * | 7/2011 | Iwai et al. ...................... 455/450 |
| 8,000,273 B2 * | 8/2011 | He et al. ........................ 370/280 |

(Continued)

FOREIGN PATENT DOCUMENTS

| JP | 2010-028192 A | 2/2010 |
| JP | 2011519196 A | 6/2011 |

(Continued)

OTHER PUBLICATIONS

Office Action dated Apr. 7, 2014, issued in counterpart Japanese patent apllication No. 2010-156703.

(Continued)

*Primary Examiner* — Brian O'Connor
(74) *Attorney, Agent, or Firm* — Procopio, Cory, Hargreaves & Savitch LLP

(57) ABSTRACT

A user data resource determination unit determines any sub carriers in any downlink subframe as a first resource from which downlink user data is transmitted to a wireless terminal. A sounding resource determination unit determines a part of an uplink part in a closest switch subframe preceding the determined downlink subframe as a second resource from which a wireless terminal transmits a sounding reference signal, and notifies the wireless terminal of the determined second resource. A transmission path state estimation unit estimates a state of a transmission path to the wireless terminal based on the sounding reference signal from the wireless terminal. A transmission unit forms directivity of a plurality of antennas based on the estimated state of the transmission path and transmits downlink user data.

12 Claims, 8 Drawing Sheets

(51) Int. Cl.
*H04B 7/02* (2006.01)
*H04L 5/00* (2006.01)
*H04L 5/14* (2006.01)

(56) References Cited

U.S. PATENT DOCUMENTS

| | | | |
|---|---|---|---|
| 8,072,911 B2* | 12/2011 | Astely et al. | 370/280 |
| 8,259,700 B2* | 9/2012 | Li et al. | 370/345 |
| 8,422,455 B1* | 4/2013 | Dinan | 370/330 |
| 8,457,079 B2* | 6/2013 | Krishnamurthy et al. | 370/336 |
| 8,537,724 B2* | 9/2013 | Love et al. | 370/280 |
| 8,537,729 B2 | 9/2013 | Hao et al. | |
| 8,588,102 B2* | 11/2013 | Hoshino et al. | 370/252 |
| 8,743,721 B2* | 6/2014 | Astely et al. | 370/252 |
| 8,781,518 B2* | 7/2014 | Nakamura et al. | 455/522 |
| 8,797,923 B2* | 8/2014 | He et al. | 370/280 |
| 2008/0318608 A1* | 12/2008 | Inoue et al. | 455/509 |
| 2009/0180435 A1 | 7/2009 | Sarkar | |
| 2009/0196204 A1* | 8/2009 | Astely et al. | 370/280 |
| 2009/0323664 A1* | 12/2009 | Li et al. | 370/344 |
| 2010/0067410 A1* | 3/2010 | He et al. | 370/280 |
| 2010/0265910 A1* | 10/2010 | Suo et al. | 370/330 |
| 2011/0058505 A1 | 3/2011 | Pan et al. | |
| 2011/0249648 A1* | 10/2011 | Jen | 370/330 |
| 2013/0121290 A1* | 5/2013 | Kim et al. | 370/329 |

FOREIGN PATENT DOCUMENTS

| | | |
|---|---|---|
| WO | 2009/089287 A2 | 7/2009 |
| WO | 2009/132591 A1 | 11/2009 |

OTHER PUBLICATIONS

International Search Report issued by Japanese Patent Office for International Application No. PCT/JP2011/065606, Oct. 11, 2011.

* cited by examiner

WIRELESS BASE STATION AND WIRELESS COMMUNICATION METHOD

TECHNICAL FIELD

The present invention relates to a wireless base station and a wireless communication method, and particularly to a wireless base station estimating a state of transmission path based on a sounding signal and a wireless communication method.

BACKGROUND ART

In a wireless communication system adapted to an LTE scheme or the like, of which specifications have been developed in 3GPP (3rd Generation Partnership Project), a wireless terminal transmits an SRS (Sounding Reference Signal) to a wireless base station. The wireless base station estimates a state of a transmission path based on the received SRS and forms antenna directivity for downlink user data (see, for example, PTL 1 (Japanese Patent Laying-Open No. 2010-28192)).

CITATION LIST

Patent Literature

PTL 1: Japanese Patent Laying-Open No. 2010-28192

SUMMARY OF INVENTION

Technical Problem

PTL 1 (Japanese Patent Laying-Open No. 2010-28192), however, does not define at which timing an SRS should be transmitted. If timing to transmit downlink user data and timing to receive an SRS are distant from each other, a state of a transmission path changes over time, which is not desirable. In contrast, if timing to transmit downlink user data and timing to receive an SRS are too close to each other, time for estimating a state of a transmission path and for forming antenna directivity cannot be secured. Consequently, antenna directivity cannot appropriately be set.

Therefore, an object of the present invention is to provide a wireless base station and a wireless communication method capable of transmitting an SRS at such timing as allowing antenna directivity to appropriately be set.

Solution To Problem

In order to solve the problem above, a wireless base station according to the present invention includes a plurality of antennas, a user data resource determination unit for determining any sub carriers within any downlink subframe as a first resource for transmitting downlink user data to a wireless terminal, a sounding resource determination unit for determining a part of an uplink part within a closest switch subframe preceding the determined downlink subframe as a second resource for the wireless terminal to transmit a sounding reference signal and notifying the wireless terminal of the determined second resource, a transmission path state estimation unit for estimating a state of a transmission path to the wireless terminal based on the sounding reference signal from the wireless terminal, and a transmission unit for forming directivity of the plurality of antennas based on the estimated state of the transmission path and transmitting the downlink user data.

Advantageous Effects of Invention

According to the present invention, an SRS can be transmitted at such timing as allowing antenna directivity to appropriately be set.

DESCRIPTION OF EMBODIMENTS

An embodiment of the present invention will be described hereinafter with reference to the drawings.

(Configuration of Wireless Communication System)

Figure 1:
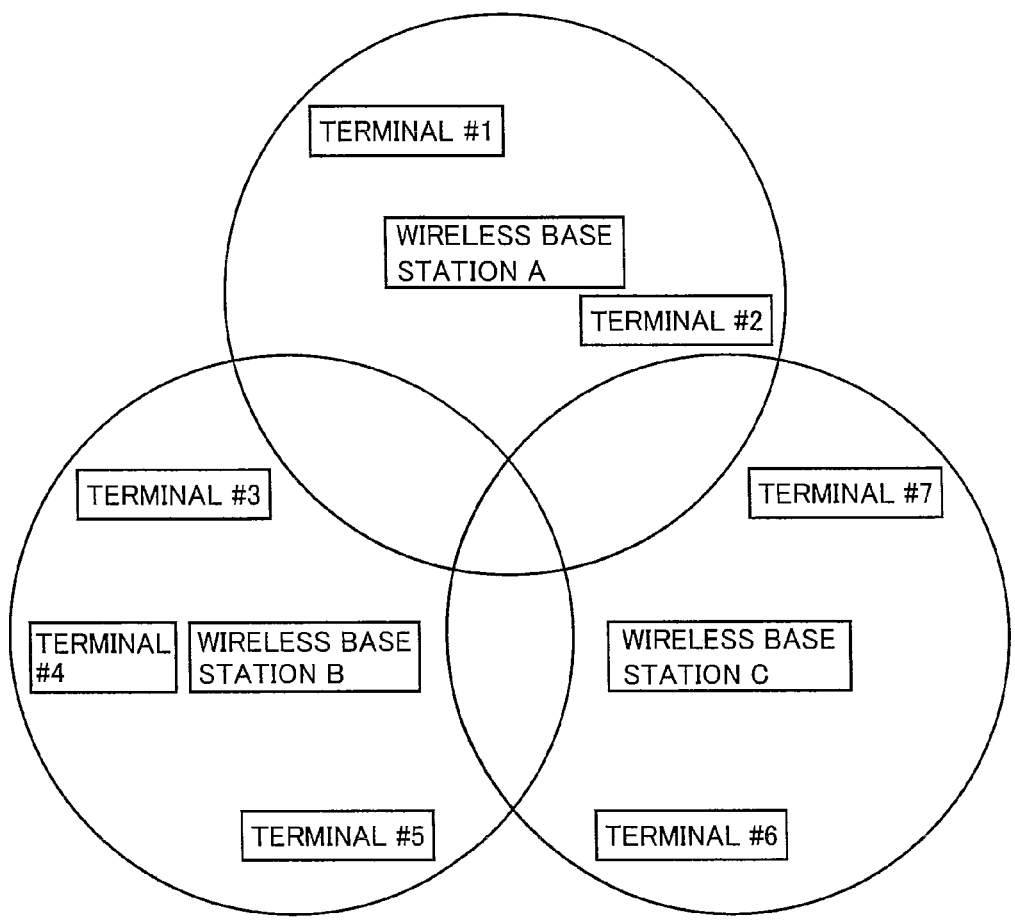
FIG. 1 is a diagram showing a configuration of a wireless communication system in an embodiment of the present invention.

FIG. 1 is a diagram showing a configuration of a wireless communication system in an embodiment of the present invention.

Referring to FIG. 1, this wireless communication system is a communication system adapted to an LTE (Long Term Evolution) scheme, in which a plurality of wireless base stations A, B, C communicate with wireless terminals within their zones shown with circles in the figure, respectively. These wireless base stations A, B, C receive uplink signals and transmit downlink signals at the same timing.

(Configuration of Wireless Base Station)

Figure 2:
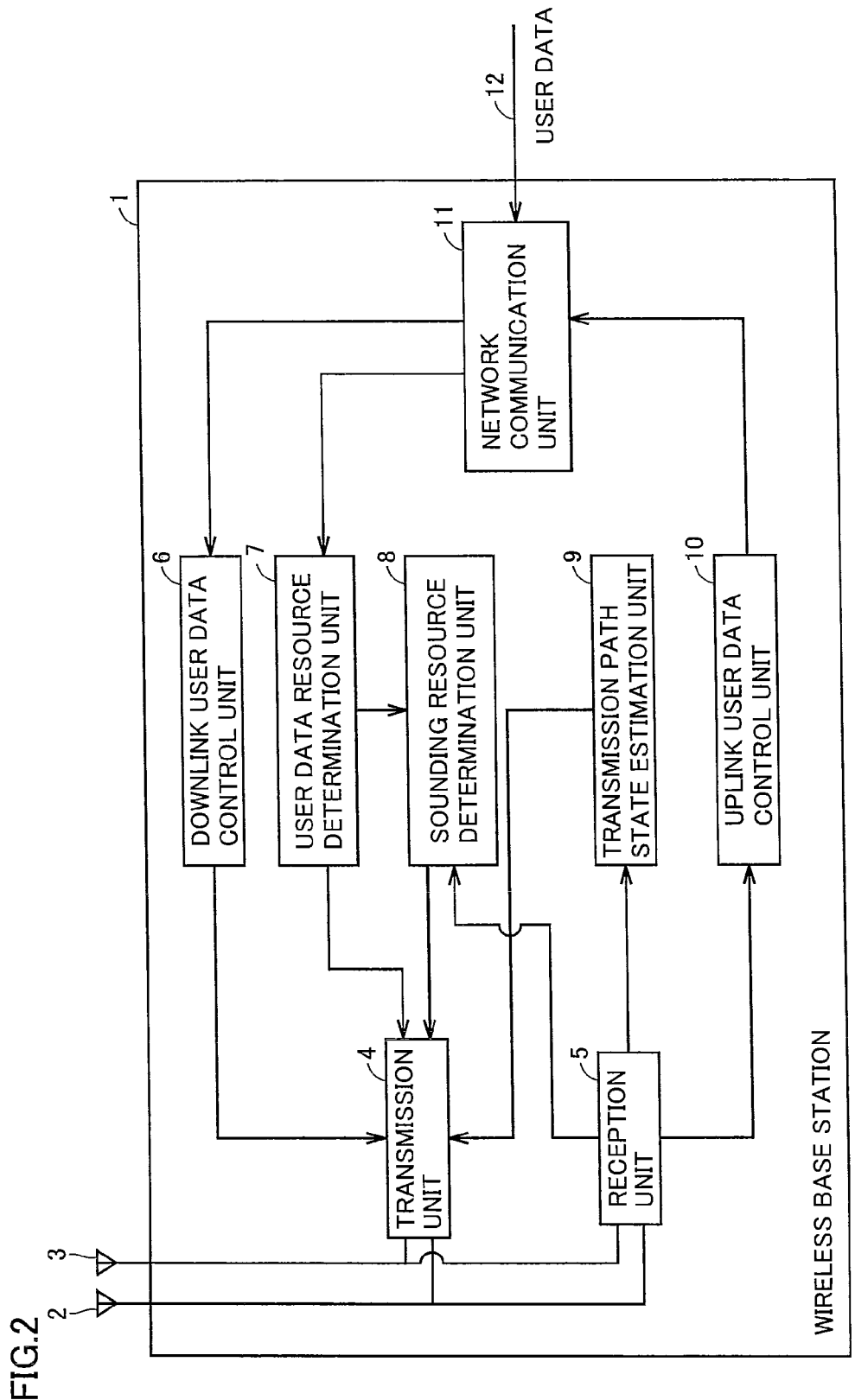
FIG. 2 is a diagram showing a configuration of a wireless base station in the embodiment of the present invention.

FIG. 2 is a diagram showing a configuration of a wireless base station in the embodiment of the present invention.

Referring to FIG. 2, this wireless base station 1 includes a plurality of antennas 2, 3, a transmission unit 4, a reception unit 5, a downlink user data control unit 6, an uplink user data control unit 10, a user data resource determination unit 7, a sounding resource determination unit 8, a transmission path state estimation unit 9, and a network communication unit 11.

Transmission unit 4 transmits downlink user data and a control signal such as an RRC (Radio Resource Control) connection re-setting message to a wireless terminal through the plurality of antennas 2, 3. Transmission unit 4 forms directivity of the plurality of antennas 2, 3 for each sub carrier based on a state of a transmission path for each sub carrier estimated by transmission path state estimation unit 9 and transmits downlink user data. For example, transmission unit 4 subjects downlink user data to adaptive array transmission processing (weight control) in accordance with a state of a transmission path for each sub carrier and forms directivity of antenna 2, 3. Here, formation of antenna directivity includes beam forming for directing beams (a portion intensely receiving/transmitting a signal) to a desired communication counterpart and null steering for directing null (a portion substantially not receiving/transmitting a signal) in an unwanted signal source direction or in a direction in which interference is not desirably effected.

Reception unit 5 receives uplink user data and a control signal such as an SRS and an RRC connection re-setting completion message from a wireless terminal through the plurality of antennas 2, 3.

Downlink user data control unit 6 holds downlink user data received from a not-shown control center through network communication unit 11.

Uplink user data control unit 10 transmits uplink user data received from a wireless terminal to the not-shown control center through network communication unit 11.

When the downlink user data control unit receives downlink user data, user data resource determination unit 7 determines any sub carriers within any downlink subframe as a first resource from which downlink user data to a wireless terminal is to be transmitted.

Sounding resource determination unit 8 determines a part of an uplink part within a closest switch subframe preceding the downlink subframe determined by user data resource determination unit 7 as a second resource for a wireless terminal to transmit an SRS. In addition, sounding resource determination unit 8 determines as sub carriers forming the second resource, a plurality of sub carriers which are some of the sub carriers included in the first resource. Sounding resource determination unit 8 notifies the wireless terminal of the determined second resource by using an RRC connection re-setting message.

Transmission path state estimation unit 9 obtains an SRS of a sub carrier included in the first resource but not included in the second resource, by interpolating an SRS received from a wireless terminal by using the second resource. Transmission path state estimation unit 9 estimates a state of a transmission path for the same sub carrier based on a signal for each sub carrier of the SRS.

Network communication unit 11 receives downlink user data from the control center through a network 12. Network communication unit 11 transmits uplink user data to the control center through network 12.

(Configuration of Wireless Terminal)

Figure 3:
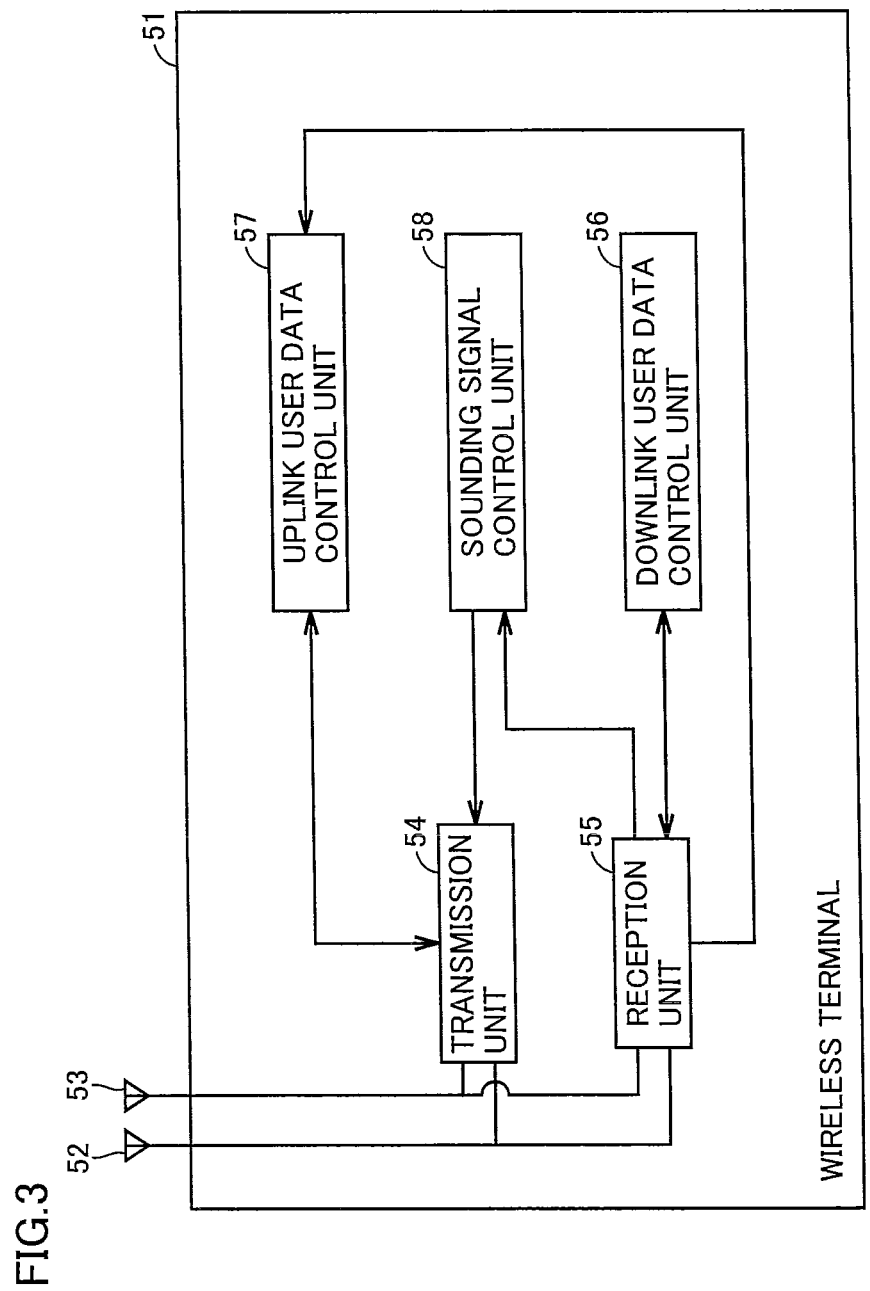
FIG. 3 is a diagram showing a configuration of a wireless terminal in the embodiment of the present invention.

FIG. 3 is a diagram showing a configuration of a wireless terminal in the embodiment of the present invention.

Referring to FIG. 3, this wireless terminal 51 includes a plurality of antennas 52, 53, a transmission unit 54, a reception unit 55, an uplink user data control unit 57, a downlink user data control unit 56, and a sounding signal control unit 58.

Reception unit 55 receives from wireless base station 1, downlink user data and a control signal such as an RRC connection re-setting message through the plurality of antennas 52, 53.

Transmission unit 54 transmits uplink user data and a control signal such as an SRS and an RRC connection re-setting completion message to wireless base station 1 through the plurality of antennas 52, 53.

Downlink user data control unit 56 holds downlink user data received from wireless base station 1.

Uplink user data control unit 57 holds uplink user data to be transmitted to wireless base station 1.

When sounding signal control unit 58 receives an RRC connection re-setting message, sounding signal control unit 58 allocates a wireless resource from which an SRS is to be transmitted, based on the RRC connection re-setting message. Thereafter, sounding signal control unit 58 transmits an RRC connection re-setting completion message. Sounding signal control unit 58 transmits an SRS by using the allocated wireless resource.

(Configuration of Frame)

Figure 4:
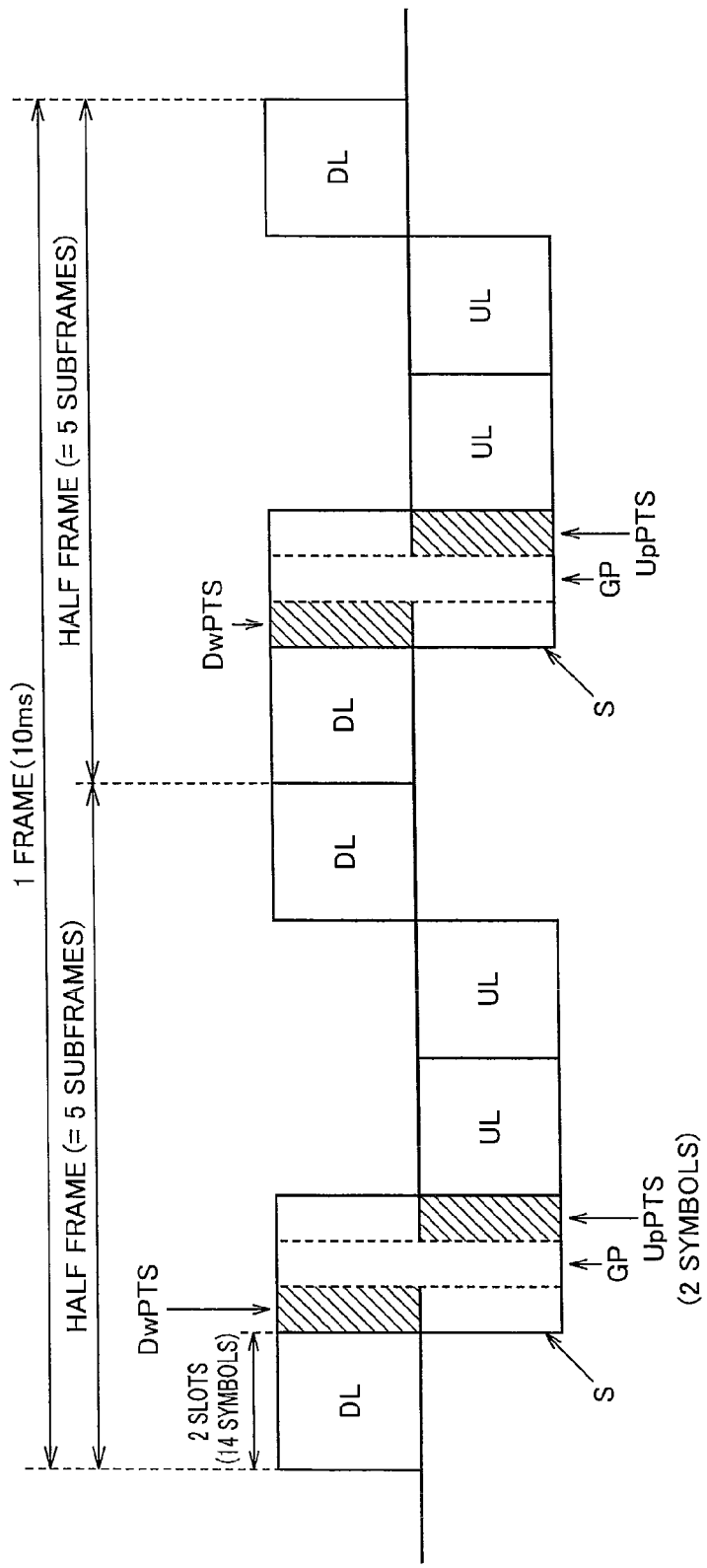
FIG. 4 is a diagram showing a configuration of a frame transmitted in the wireless communication system in the embodiment of the present invention.

FIG. 4 is a diagram showing a configuration of a frame transmitted in the wireless communication system in the embodiment of the present invention.

Referring to FIG. 4, a configuration of this frame is a configuration at the time when an (Uplink-downlink configuration) is set to "1".

As shown in FIG. 4, one frame is transmitted in a time period of 10 ms. One frame is divided into half frames. Each half frame is formed, in time sequence, of a downlink subframe DL, a switch subframe S, two consecutive uplink subframes UL, and a downlink subframe DL.

Here, switch subframe S is formed of a DwPTS (Downlink Pilot Timeslot), a GP (Guard Period), and an UpPTS (Uplink Pilot Timeslot). The UpPTS is formed of 2 symbols.

Figure 5:
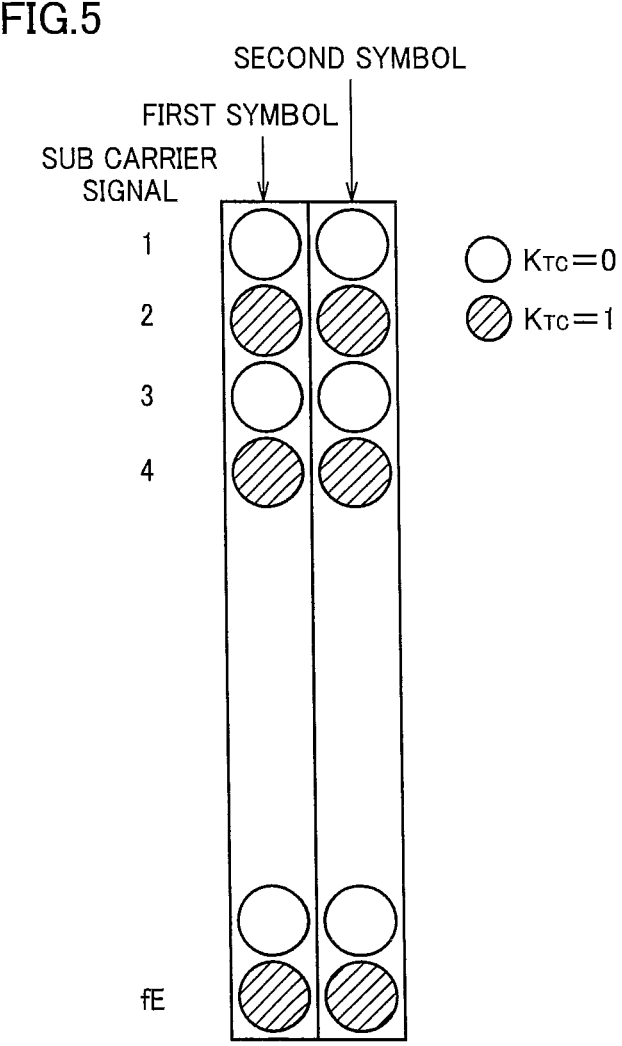
FIG. 5 is a diagram showing a configuration of an UpPTS in FIG. 4.

FIG. 5 is a diagram showing a configuration of the UpPTS in FIG. 4.

Referring to FIG. 5, the UpPTS is formed of a first symbol and a second symbol in time sequence. A plurality of sub carriers forming each symbol are classified into any of a first sub carrier group of which TransmissionComb parameter kTC is 0 and a second sub carrier group of which TransmissionComb parameter kTC is 1.

A sub carrier in the first sub carrier group of which TransmissionComb parameter kTC is 0 is a sub carrier having an odd sub carrier number. A sub carrier in the second sub carrier group of which TransmissionComb parameter kTC is 1 is a sub carrier having an even sub carrier number. Here, a sub carrier greater in sub carrier number is higher in frequency. A sub carrier number of a sub carrier lowest in frequency of frequencies at which an SRS can be arranged is set to "1".

(Example of Resource Used for Transmission of User Data and SRS)

It is assumed that one wireless base station 1 communicates with wireless terminals #1 to #8.

Figure 6:
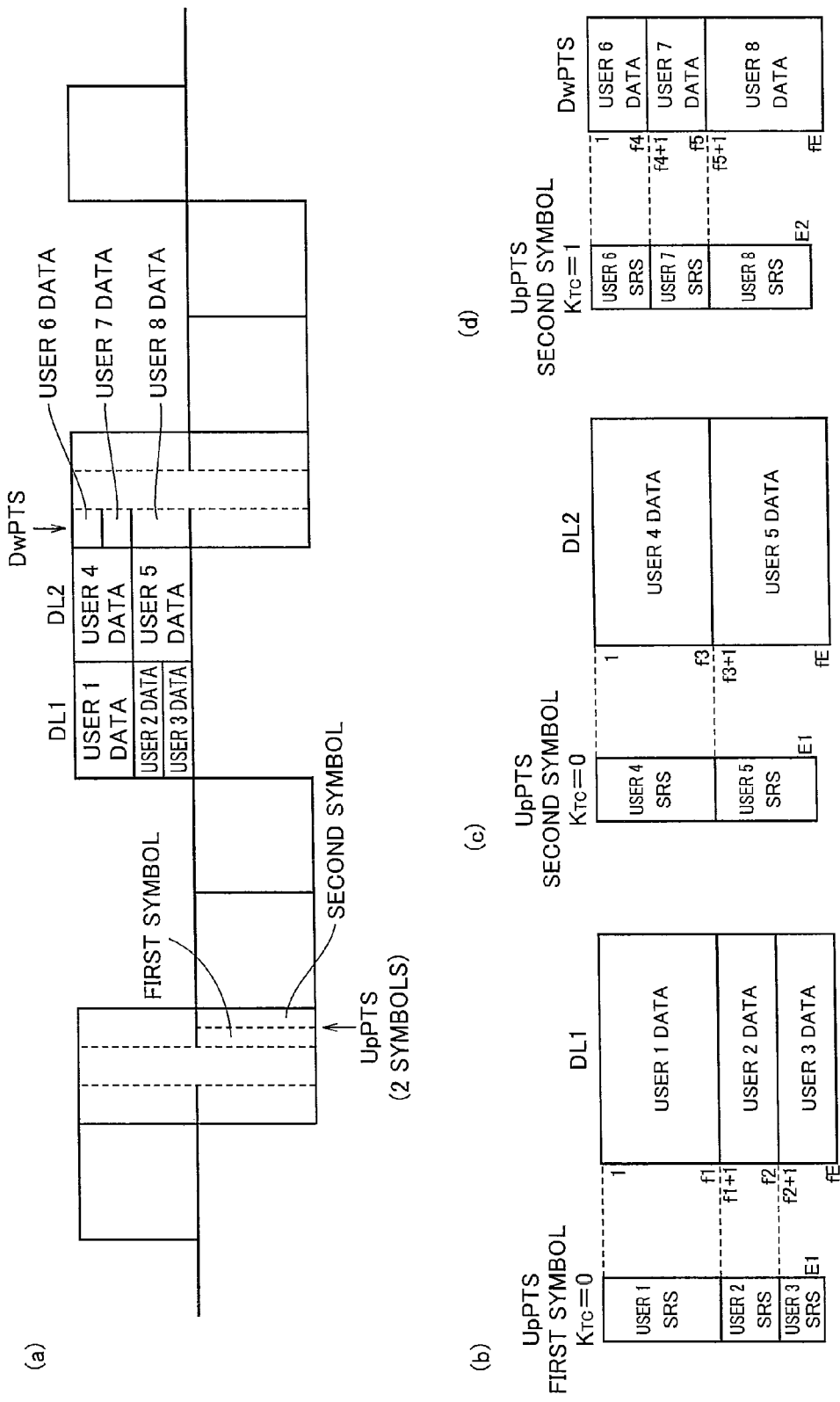
FIG. 6 (a) to (d) is a diagram for illustrating a first resource from which downlink user data is transmitted and a second resource from which an SRS is transmitted, in a frame.

FIG. 6 (*a*) to (*d*) is a diagram for illustrating a first resource from which downlink user data is transmitted and a second resource from which an SRS is transmitted.

Referring to FIG. 6 (*a*), in a downlink subframe DL1, downlink user data for a wireless terminal in a first group, that is, user 1 data (downlink user data to wireless terminal #1), user 2 data (downlink user data to wireless terminal #2), and user 3 data (downlink user data to wireless terminal #3), is transmitted.

In a downlink subframe DL2, downlink user data for a wireless terminal in a second group, that is, user 4 data (downlink user data to wireless terminal #4) and user 5 data (downlink user data to wireless terminal #5), is transmitted.

In the DwPTS within switch subframe S, downlink user data for a wireless terminal in a third group, that is, user 6 data (downlink user data to wireless terminal #6), user 7 data (downlink user data to wireless terminal #7), and user 8 data (downlink user data to wireless terminal #8), is transmitted.

SRSs from wireless terminals #1 to #8 for which downlink user data is transmitted in downlink subframes DL1, DL2 and the DwPTS in switch subframe S are transmitted in the UpPTS in closest switch subframe S preceding downlink subframes DL1, DL2 and switch subframe S.

FIG. 6 (*b*) is a diagram for illustrating the second resource used for transmission of an SRS by wireless terminals #1 to #3, from which downlink user data is transmitted in downlink subframe DL1.

As shown in FIG. 6 (*b*), wireless terminals #1 to #3 in the first group use as the wireless resource, the first sub carrier group having TransmissionComb parameter kTC of 0 in the first symbol, for transmission of the SRS.

Sub carriers which are some of the plurality of sub carriers forming the first resource from which downlink user data to wireless terminal #1 is transmitted are used as sub carriers forming the second resource from which an SRS from wireless terminal #1 is transmitted. Namely, a sub carrier number at a lower limit of a sub carrier range of user 1 data is "1". A sub carrier number at an upper limit of the sub carrier range of user 1 data is "f1". On the other hand, a sub carrier number at a lower limit of a sub carrier range of user 1 SRS is "1". A sub carrier number at an upper limit of the sub carrier range of user 1 SRS is "f1" when "f1" is an odd number, and it is "f1−1" when "f1" is an even number.

Transmission path state estimation unit 9 of wireless base station 1 estimates a state of a transmission path to wireless terminal #1 for each of sub carriers having sub carrier numbers from "1 to f1" by finding a signal in the second sub carrier group by interpolation from a signal in the first sub carrier group constructing the received SRS.

Sub carriers which are some of the plurality of sub carriers forming the first resource from which downlink user data to wireless terminal #2 is transmitted are used as sub carriers forming the second resource from which an SRS from wireless terminal #2 is transmitted. Namely, a sub carrier number at a lower limit of a sub carrier range of user 2 data is "f1+1". A sub carrier number at an upper limit of the sub carrier range of user 2 data is "f2". On the other hand, a sub carrier number at a lower limit of a sub carrier range of user 2 SRS is "f1" when "f1" is an odd number and it is "f1+1" when "f1" is an even number. A sub carrier number at an upper limit of the sub carrier range of user 2 SRS is "f2" when "f2" is an odd number and it is "f2−1" when "f2" is an even number.

Transmission path state estimation unit 9 of wireless base station 1 estimates a state of a transmission path to wireless terminal #2 for each of sub carriers having sub carrier numbers from "f1+1 to f2" by finding a signal in the second sub carrier group by interpolation from a signal in the first sub carrier group constructing the received SRS.

Sub carriers which are some of the plurality of sub carriers forming the first resource from which downlink user data to wireless terminal #3 is transmitted are used as sub carriers forming the second resource from which an SRS from wireless terminal #3 is transmitted. Namely, a sub carrier number at a lower limit of a sub carrier range of user 3 data is "f2+1". A sub carrier number at an upper limit of the sub carrier range of user 3 data is "fE". On the other hand, a sub carrier number at a lower limit of a sub carrier range of user 3 SRS is "f2" when "f2" is an odd number and it is "f2+1" when "f2" is an even number. A sub carrier number at an upper limit of the sub carrier range of user 3 SRS is E1 (an odd number). Here, fE−E1=D1 (a positive number).

Transmission path state estimation unit 9 of wireless base station 1 estimates a state of a transmission path to wireless terminal #3 for each of sub carriers having sub carrier numbers from "f2+1 to fE" by finding a signal in the second sub carrier group and a signal of a sub carrier of E1+1 to fE by interpolation from a signal in the first sub carrier group constructing the received SRS.

FIG. 6 (c) is a diagram for illustrating the second resource used for transmission of an SRS by wireless terminals #4, #5, from which downlink user data is transmitted in downlink subframe DL2.

As shown in FIG. 6 (c), wireless terminals #4, #5 in the second group use as the wireless resource, the first sub carrier group having TransmissionComb parameter kTC of 0 in the second symbol, for transmission of the SRS.

Sub carriers which are some of the plurality of sub carriers forming the first resource from which downlink user data to wireless terminal #4 is transmitted are used as sub carriers forming the second resource from which an SRS from wireless terminal #4 is transmitted. Namely, a sub carrier number at a lower limit of a sub carrier range of user 4 data is "1". A sub carrier number at an upper limit of the sub carrier range of user 4 data is "f3". On the other hand, a sub carrier number at a lower limit of a sub carrier range of user 4 SRS is "1". A sub carrier number at an upper limit of the sub carrier range of user 4 SRS is "f3" when "f3" is an odd number, and it is "f3−1" when "f3" is an even number.

Transmission path state estimation unit 9 of wireless base station 1 estimates a state of a transmission path to wireless terminal #4 for each of sub carriers having sub carrier numbers from "1 to f3" by finding a signal in the second sub carrier group by interpolation from a signal in the first sub carrier group constructing the received SRS.

Sub carriers which are some of the plurality of sub carriers forming the first resource from which downlink user data to wireless terminal #5 is transmitted are used as sub carriers forming the second resource from which an SRS from wireless terminal #5 is transmitted. Namely, a sub carrier number at a lower limit of a sub carrier range of user 5 data is "f3+1". A sub carrier number at an upper limit of the sub carrier range of user 5 data is "fE". On the other hand, a sub carrier number at a lower limit of a sub carrier range of user 5 SRS is "f3" when "f3" is an odd number and it is "f3+1" when "f3" is an even number. A sub carrier number at an upper limit of the sub carrier range of user 5 SRS is E1 (an odd number).

Transmission path state estimation unit 9 of wireless base station 1 estimates a state of a transmission path to wireless terminal #5 for each of sub carriers having sub carrier numbers from "f3+1 to fE" by finding a signal in the second sub carrier group and a signal of a sub carrier of E1+1 to fE by interpolation from a signal in the first sub carrier group constructing the received SRS.

FIG. 6 (d) is a diagram for illustrating the second resource used for transmission of an SRS by wireless terminals #6 to #8, from which downlink user data is transmitted in the DwPTS in switch subframe S.

As shown in FIG. 6 (d), wireless terminals #6 to #8 in the third group use as the wireless resource, the second sub carrier group having TransmissionComb parameter kTC of 1 in the second symbol, for transmission of the SRS.

Sub carriers which are some of the plurality of sub carriers forming the first resource from which downlink user data to wireless terminal #6 is transmitted are used as sub carriers forming the second resource from which an SRS from wireless terminal #6 is transmitted. Namely, a sub carrier number at a lower limit of a sub carrier range of user 6 data is "1". A sub carrier number at an upper limit of the sub carrier range of user 6 data is "f4". On the other hand, a sub carrier number at a lower limit of a sub carrier range of user 6 SRS is "1". A sub carrier number at an upper limit of a sub carrier range of user 6 SRS is "f4" when "f4" is an odd number, and it is "f4−1" when "f4" is an even number.

Transmission path state estimation unit 9 of wireless base station 1 estimates a state of a transmission path to wireless terminal #6 for each of sub carriers having sub carrier numbers from "1 to f4" by finding a signal in the first sub carrier group by interpolation from a signal in the second sub carrier group constructing the received SRS.

Sub carriers which are some of the plurality of sub carriers forming the first resource from which downlink user data to wireless terminal #7 is transmitted are used as sub carriers forming the second resource from which an SRS from wireless terminal #7 is transmitted. Namely, a sub carrier number at a lower limit of a sub carrier range of user 7 data is "f4+1". A sub carrier number at an upper limit of the sub carrier range of user 7 data is "f5". On the other hand, a sub carrier number at a lower limit of a sub carrier range of user 7 SRS is "f4" when "f4" is an odd number and it is "f4+1" when "f4" is an even number. A sub carrier number at an upper limit of the sub carrier range of user 7 SRS is "f5" when "f5" is an odd number and it is "f5−1" when "f5" is an even number.

Transmission path state estimation unit 9 of wireless base station 1 estimates a state of a transmission path to wireless terminal #7 for each of sub carriers having sub carrier numbers from "f4+1 to f5" by finding a signal in the first sub carrier group by interpolation from a signal in the second sub carrier group constructing the received SRS.

Sub carriers which are some of the plurality of sub carriers forming the first resource from which downlink user data to wireless terminal #8 is transmitted are used as sub carriers forming the second resource from which an SRS from wireless terminal #8 is transmitted. Namely, a sub carrier number at a lower limit of a sub carrier range of user 8 data is "f5+1". A sub carrier number at an upper limit of the sub carrier range of user 8 data is "fE". On the other hand, a sub carrier number at a lower limit of a sub carrier range of user 8 SRS is "f5" when "f5" is an odd number and it is "f5+1" when "f5" is an even number. A sub carrier number at an upper limit of a sub carrier range of user 8 SRS is E2 (an even number). Here, fE−E2=D2 (a positive number).

Transmission path state estimation unit 9 of wireless base station 1 estimates a state of a transmission path to wireless terminal #8 for each of sub carriers having sub carrier numbers from "f5+1 to fE" by finding a signal in the first sub carrier group and a signal of a sub carrier of E1+1 to fE by interpolation from a signal in the second sub carrier group constructing the received SRS.

(Schedule Example)

Figure 7:
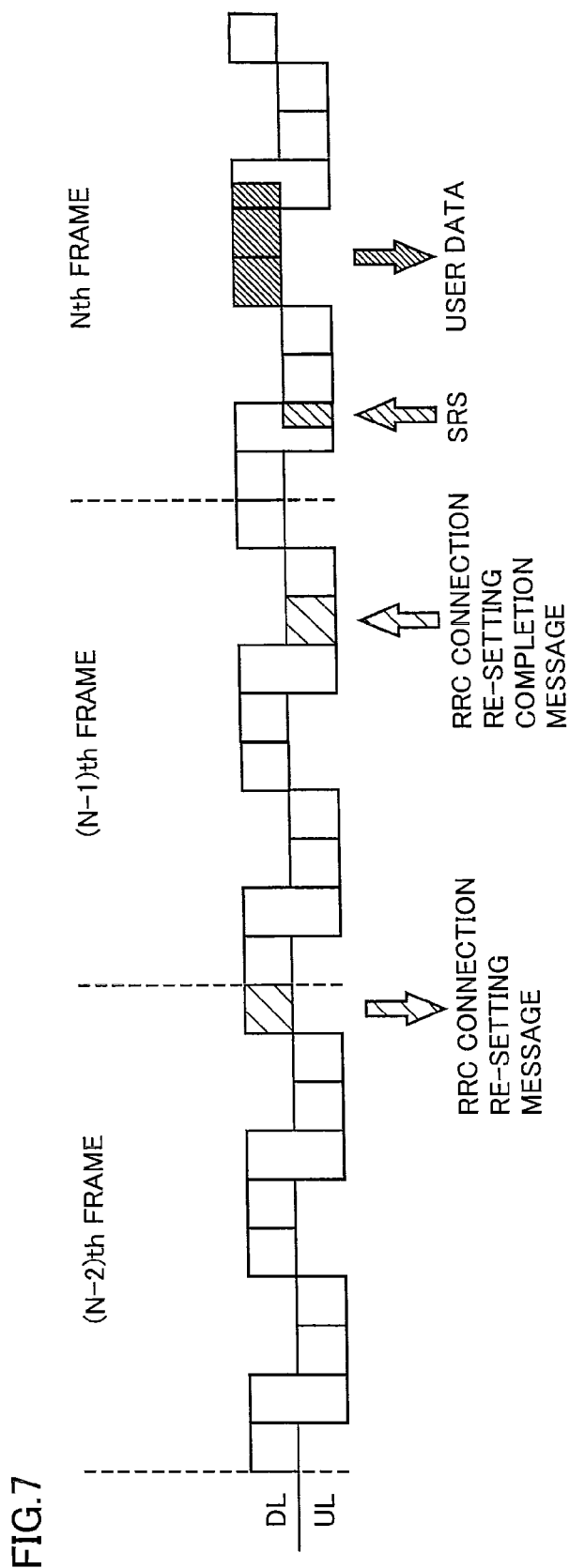
FIG. 7 is a diagram for illustrating timing to give notification about the second resource from which an SRS is transmitted.

FIG. 7 is a diagram for illustrating timing to give notification about the second resource from which an SRS is transmitted.

Referring to FIG. 7, initially, in an (N−2)th frame, user data resource determination unit 7 determines the first resource from which downlink user data is to be transmitted in an Nth frame. Sounding resource determination unit 8 determines the second resource from which an SRS is to be transmitted in the wireless terminal which is a destination of downlink user data. Sounding resource determination unit 8 transmits an RRC connection re-setting message representing the determined second resource through a downlink subframe.

In an (N−1)th frame, sounding resource determination unit 8 receives an RRC connection re-setting completion message through an uplink subframe.

In the Nth frame, sounding resource determination unit 8 receives an SRS through the UpPTS. Transmission path state estimation unit 9 estimates a state of a transmission path to the wireless terminal based on the SRS. The transmission unit 4 forms directivity of a plurality of antennas based on the estimated state of the transmission path and transmits downlink user data.

Here, it is assumed that a wireless resource (time and a sub carrier) from which an SRS is transmitted and a wireless resource for transmission of a DL subframe, from which downlink user data reflecting the state of the transmission path estimated based on the SRS is transmitted, are common to adjacent wireless base stations. Thus, at the same time as beam forming and transmission of a DL subframe to a wireless terminal covered by the wireless base station itself, interference can be lessened through null steering in a wireless terminal receiving the same DL subframe, which is a communication counterpart covered by another wireless base station.

(Operation Procedure)

Figure 8:
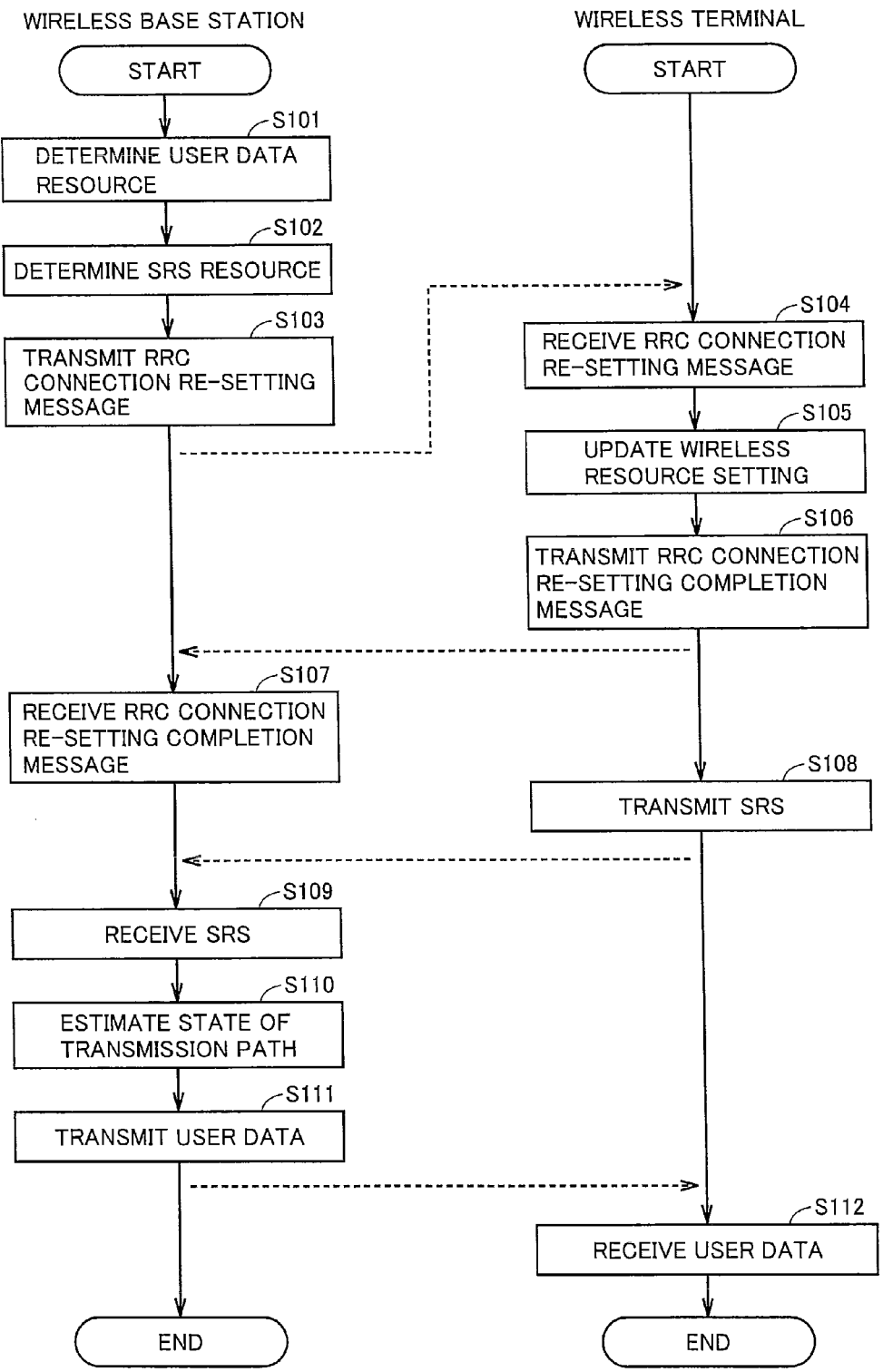
FIG. 8 is a flowchart showing an operation procedure in the wireless communication system in the embodiment of the present invention.

FIG. 8 is a flowchart showing an operation procedure in the wireless communication system in the embodiment of the present invention.

Referring to FIG. 8, initially, user data resource determination unit 7 of wireless base station 1 determines the first resource for transmission of downlink user data to a wireless terminal (step S101).

Then, sounding resource determination unit 8 of wireless base station 1 determines as the second resource from which an uplink sounding signal is transmitted, any resource in the UpPTS in the closest switch subframe preceding the downlink subframe forming the first resource determined in step S101 (step S102).

Then, sounding resource determination unit 8 of wireless base station 1 transmits an RRC connection re-setting message representing the determined second resource (step S103).

Then, sounding signal control unit 58 of wireless terminal 51 receives the RRC connection re-setting message (step S104).

Then, sounding signal control unit 58 of wireless terminal 51 allocates a wireless resource from which an SRS is to be transmitted, based on the RRC connection re-setting message (step S105).

Then, sounding signal control unit 58 of wireless terminal 51 transmits an RRC connection re-setting completion message (step S106).

Then, sounding resource determination unit 8 of wireless base station 1 receives the RRC connection re-setting completion message (step S107).

Then, sounding signal control unit 58 of wireless terminal 51 transmits an SRS by using the allocated wireless resource (step S108).

Then, sounding resource determination unit 8 of wireless base station 1 receives the SRS (step S109).

Then, transmission path state estimation unit 9 of wireless base station 1 estimates a state of a transmission path to wireless terminal 51, based on the received SRS (step S110).

Then, transmission unit 4 of wireless base station 1 forms directivity of the plurality of antennas 2, 3 based on the estimated state of the transmission path and transmits downlink user data (step S111).

Then, reception unit 55 of wireless terminal 51 receives the downlink user data through the plurality of antennas 52, 53 (step S112).

As above, according to the wireless communication system in the embodiment of the present invention, an SRS is transmitted in a part of an uplink part in a closest switch subframe preceding a downlink subframe in which downlink user data is to be transmitted. Therefore, the timing to transmit downlink user data and the timing to transmit an SRS are close to each other, and time for estimating a state of a transmission path based on the SRS and setting of antenna directivity can be ensured. Consequently, antenna directivity can appropriately be set.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 wireless base station; 2, 3, 52, 53 antenna; 4, 54 transmission unit; 5, 55 reception unit; 6, 56 downlink user data control unit; 7 user data resource determination unit; 8 sounding resource determination unit; 9 transmission path state estimation unit; 10, 57 uplink user data control unit; 11 network communication unit; and 12 network.

The invention claimed is:

1. A wireless base station, comprising:
   a plurality of antennas;
   a user data resource determination unit for determining one or more sub carriers within a first downlink subframe as a first resource for transmitting downlink user data to a wireless terminal;
   a sounding resource determination unit for determining a second resource for said wireless terminal to transmit a sounding reference signal and notifying said wireless terminal of determined said second resource, wherein determining the second resource comprises
      determining a switch subframe that precedes the first downlink subframe in time and is closer in time to the first downlink subframe than any other switch subframe preceding the first downlink subframe in time, wherein the switch subframe comprises an uplink part comprising a first symbol and a second symbol, and wherein each of the first symbol and the second symbol comprises a plurality of sub carriers, and
      selecting a group of one or more sub carriers from either the first symbol or the second symbol as the second resource, such that at least one of the second symbol of the switch subframe or a second downlink subframe is interposed in time between the selected group of one or more sub carriers and the first downlink subframe;
   a transmission path state estimation unit for estimating a state of a transmission path to said wireless terminal based on the sounding reference signal from said wireless terminal; and
   a transmission unit for forming directivity of said plurality of antennas based on estimated said state of the transmission path and transmitting said downlink user data.

2. The wireless base station according to claim 1, wherein said wireless base station is a wireless base station in a communication system adapted to an LTE (Long Term Evolution) scheme, and said uplink part is an UpPTS (uplink pilot timeslot).

3. The wireless base station according to claim 1, wherein, when the first downlink subframe is the closest downlink subframe in time to the switch subframe, the sounding resource determination unit selects a group of one or more subcarriers from the first symbol as the second resource.

4. The wireless base station according to claim 1, wherein, when the first downlink subframe is not the closest downlink subframe in time to the switch subframe, the sounding resource determination unit selects a group of one or more subcarriers from the second symbol as the second resource.

5. The wireless base station according to claim 1, wherein, when the first downlink subframe is a downlink pilot timeslot (DwPTS) of a subsequent switch subframe, the sounding resource determination unit selects a group of one or more subcarriers from the second symbol as the second resource.

6. The wireless base station according to claim 2, wherein said sounding resource determination unit selects the group of one or more sub carriers, forming said second resource, such that the selected group of one or more sub carriers consists of at least a portion of the sub carriers forming the first resource.

7. The wireless base station according to claim 6, wherein said transmission path state estimation unit obtains a sounding reference signal for a sub carrier included in said first resource but not included in said second resource by interpolating the received sounding reference signal.

8. The wireless base station according to claim 7, wherein said transmission path state estimation unit estimates the state of the transmission path for each sub carrier of the first resource based on a signal for each corresponding sub carrier of said sounding reference signal, and wherein said transmission unit forms directivity of said plurality of antennas based on the state of the transmission path for each sub carrier.

9. The wireless base station according to claim 8, wherein in said wireless base station, said user data resource determination unit and said sounding resource determination unit determine said first resource and said second resource in accordance with a frame configuration of which Uplink-downlink configuration is "1", respectively.

10. The wireless base station according to claim 9,
    wherein said UpPTS consists of the first symbol and the second symbol in time sequence,
    wherein a plurality of sub carriers forming said UpPTS are classified into any of a first sub carrier group of which TransmissionComb is 0 and a second sub carrier group of which TransmissionComb is 1,
    wherein said user data resource determination unit determines the first downlink subframe as the first resource for transmitting downlink user data to a plurality of wireless terminals, and
    wherein said sounding resource determination unit determines the second resource, for said plurality of wireless terminals to transmit sounding reference signals, as an identical sub carrier group having an identical symbol within the UpPTS.

11. A wireless base station, comprising:
    a plurality of antennas;
    a user data resource determination unit for determining any sub carriers within any downlink subframe as a first resource for transmitting downlink user data to a wireless terminal;
    a sounding resource determination unit for determining a part of an uplink pilot timeslot (UpPTS) within a closest switch subframe preceding determined said downlink subframe as a second resource for said wireless terminal to transmit a sounding reference signal and notifying said wireless terminal of determined said second resource;
    a transmission path state estimation unit for estimating a state of a transmission path to said wireless terminal based on the sounding reference signal from said wireless terminal; and
    a transmission unit for forming directivity of said plurality of antennas based on estimated said state of the transmission path and transmitting said downlink user data;
    wherein a symbol forming said UpPTS consists of a first symbol and a second symbol in time sequence, a plurality of sub carriers forming said UpPTS are classified into any of a first sub carrier group of which TransmissionComb is 0 and a second sub carrier group of which TransmissionComb is 1, a downlink subframe earlier in time of two consecutive downlink subframes in a frame is defined as a first downlink subframe and a subframe later in time thereof is defined as a second downlink subframe, and wherein a switch subframe subsequent to said second downlink subframe is defined as a first switch subframe,
    wherein said user data resource determination unit determines as said first downlink subframe, the first resource for transmitting downlink user data for a wireless terminal in a first group, determines as said second downlink subframe, the first resource for transmitting downlink user data for a wireless terminal in a second group, and determines as a downlink part within said first switch subframe, the first resource for transmitting downlink user data for a wireless terminal in a third group, wherein said sounding resource determination unit determines the second resource for the wireless terminal in said first group to transmit a sounding reference signal as any one sub carrier group of said first sub carrier group and said second sub carrier group in said first symbol within said UpPTS, wherein said sounding resource determination unit determines the second resource for the wireless terminal in said second group to transmit a sounding reference signal as any one sub carrier group of said first sub carrier group and said second sub carrier group in said second symbol within said UpPTS, and wherein said sounding resource determination unit determines the second resource for the wireless terminal in said third group to transmit a sounding reference signal as the other sub carrier group of said first sub carrier group and said second sub carrier group in said second symbol within said UpPTS.

12. A wireless communication method, comprising:

determining one or more sub carriers within a first downlink subframe as a first resource for transmitting downlink user data to a wireless terminal;

determining a second resource for said wireless terminal to transmit a sounding reference signal by determining a switch subframe that precedes the first downlink subframe in time and is closer in time to the first downlink subframe than any other switch subframe preceding the first downlink subframe in time, wherein the switch subframe comprises an uplink part comprising a first symbol and a second symbol, and wherein each of the first symbol and the second symbol comprises a plurality of sub carriers, and selecting a group of one or more sub carriers from either the first symbol or the second symbol as the second resource, such that at least one of the second symbol of the switch subframe or a second downlink subframe is interposed in time between the selected group of one or more sub carriers and the first downlink subframe, notifying said wireless terminal of determined said second resource;

estimating a state of a transmission path to said wireless terminal based on the sounding reference signal from said wireless terminal; and forming directivity of a plurality of antennas based on estimated said state of the transmission path and transmitting said downlink user data.

* * * * *